H. E. FIELD.
FLEXIBLE PIPE JOINT.
APPLICATION FILED APR. 24, 1914.

1,300,945.

Patented Apr. 15, 1919.

Witnesses

Inventor
H. E. Field,
by A. S. Pattison,
Attorney

UNITED STATES PATENT OFFICE.

HERBERT E. FIELD, OF WHEELING, WEST VIRGINIA.

FLEXIBLE PIPE-JOINT.

1,300,945. Specification of Letters Patent. Patented Apr. 15, 1919.

Application filed April 24, 1914. Serial No. 834,208.

*To all whom it may concern:*

Be it known that I, HERBERT E. FIELD, a citizen of the United States, residing at Wheeling, in the county of Ohio and State of West Virginia, have invented certain new and useful Improvements in Flexible Pipe-Joints, of which the following is a specification, reference being had therein to the accompanying drawing.

My invention relates to improvements in flexible pipe joints the primary object of which is to devise a joint between two pipes which is of a flexible character. The invention is particularly applicable to the joint between the bell flange of one pipe and the spigot end of another.

The present invention consists in the grinding and polishing of the inner surface of the bell flange end of one pipe in which is inserted the spigot end of another pipe, the space between the two pipes being filled with molten lead.

The object of the present improvement is to devise a flexible pipe joint so polished and fitted that the difficulties heretofore experienced with comparative rough and uneven surfaces of the pipes are obviated.

Further objects and advantages of the present improvement will be hereinafter described and pointed out in the specification.

Figure 1:
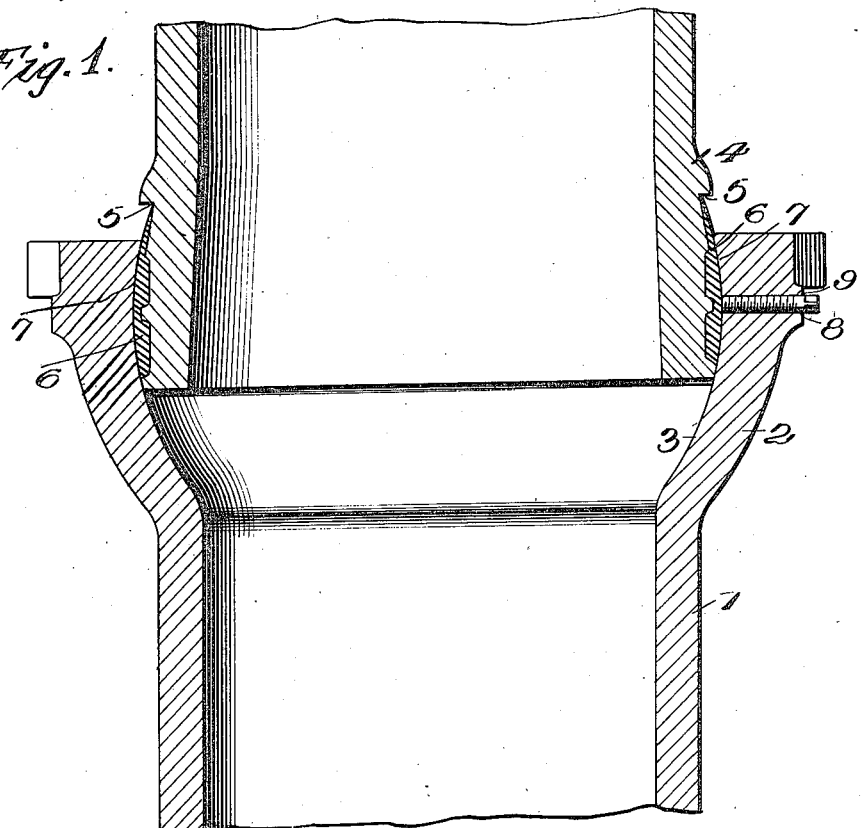
Figure 1 is a sectional view through the joint of two pipes showing my improved polished joint applied.
Figure 2:
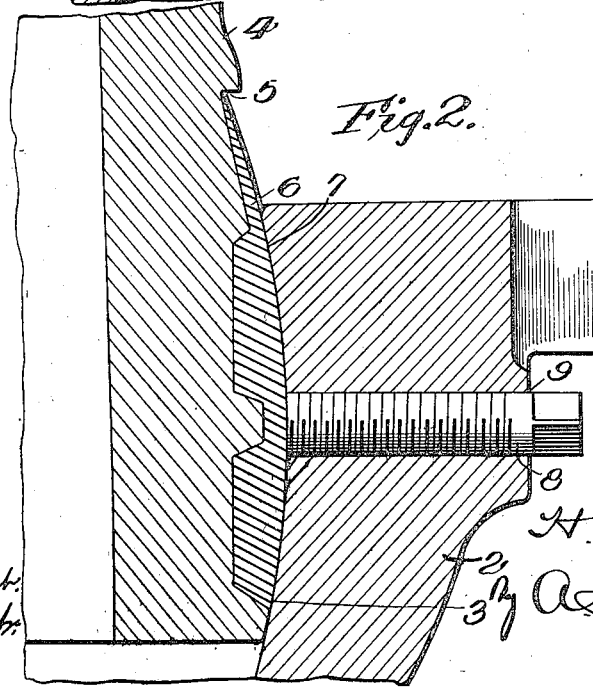
Fig. 2 is an enlarged cross sectional detailed view of my improved joint.

Referring now to the drawings in which like reference numerals designate similar parts, 1 represents a section of pipe having a bell flange 2 at its end. The inner surface 3 of the bell flange has been shown ground and polished to a smooth and true circular surface. Within the bell flange 3 is inserted the end of a section of pipe 4, which end is known as a spigot end. This spigot end is provided on its outer surface with a series of circular abrasions or grooves 5 which form a seat for molten lead 6 which is poured therewithin, the lead being formed to assume a smooth circular outer surface 7.

The ends of the two pipes are provided with these co-acting smooth surfaces for the purpose of allowing a certain flexibility of alinement in joining the pipes together. The polished inner surface 3 of the bell flange 2 will move over the smooth surface 7 of the lead 6 with a minimum amount of friction and will not in any way abrade or destroy the lead filling.

From the foregoing description it will be seen that my improvement evolves a pipe joint of great simplicity which has the greatest flexibility in alining the pipes.

The flexible pipe joint here disclosed is especially intended for use on river bottoms, where the joints are in contact with and supported by the muddy and sandy bottoms usually constituting such bottoms. It is also especially intended for large pipes, such, for instance, as water mains, etc., which pass under the water, and rest upon the bottom of the river, lake, etc. These bottoms are shifting and, as a consequence, there is a movement at the joints.

Heretofore, so far as I am aware, there has been no flexible pipe joint so constructed that it could rest upon and be in contact with muddy and sandy river bottoms where they are subjected to movement, and would prevent the sand and minute particles composing the bottom from working into the joints, and the joints remain tight under such conditions.

By reason of the polished surface of this joint coöperating with the corresponding surface of soft metal, actual practical use of my invention has demonstrated that there will be no working into the joint of mud, sand or dirt to cut and wear the surface, and thereby in a short time cutting the joint and making it leaky, defective and unfit for practical service when subjected to the above conditions.

Having thus described my invention what I claim and desire to secure by Letters Patent is:

1. A flexible pipe joint adapted to be supported upon shifting muddy and sandy bottoms, as of rivers, comprising two pipes, one of said pipes having a bell flange, the inner side of the said bell flange highly ground and polished, the other pipe having a spigot end inserted within the flange, a soft metal carried by the spigot end, the said soft metal having a smooth circular outer surface corresponding with and coöperating with the polished inner surface of the said bell flange, whereby the joint is rigidly held against endwise movement, and the mud, sand or dirt of river bottoms is prevented from working into said joint, substantially as described.

2. The method of making a mud, dirt and sand-proof flexible pipe joint between a bell flange and a spigot end for the purpose described, consisting in highly polishing the inner surface of the bell flange, pouring molten soft metal in the space between the bell flange and the spigot end, whereby the lead will have a polished circular outer surface corresponding with and coöperating with the inner polished surface of the bell flange, whereby the joint is rigidly held against endwise movement, substantially as and for the purpose described.

In testimony whereof I hereunto affix my signature in the presence of two witnesses.

HERBERT E. FIELD.

Witnesses:
ARTHUR P. AYLING,
C. A. ZINK.